(12) United States Patent
Chan

(10) Patent No.: US 11,216,612 B2
(45) Date of Patent: Jan. 4, 2022

(54) SIZE-OPTIMIZED DATA INTERCHANGE METHOD AND SYSTEM

(71) Applicant: VERIZON PATENT AND LICENSING INC., Basking Ridge, NJ (US)

(72) Inventor: Patrick Chan, Palto Alto, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 110 days.

(21) Appl. No.: 16/580,517

(22) Filed: Sep. 24, 2019

(65) Prior Publication Data

US 2020/0019604 A1    Jan. 16, 2020

Related U.S. Application Data

(62) Division of application No. 14/978,560, filed on Dec. 22, 2015, now Pat. No. 10,437,924.

(51) Int. Cl.
*G06F 16/24* (2019.01)
*G06F 16/84* (2019.01)
*G06F 16/958* (2019.01)
*G06F 40/186* (2020.01)

(52) U.S. Cl.
CPC ............ *G06F 40/186* (2020.01); *G06F 16/84* (2019.01); *G06F 16/986* (2019.01)

(58) Field of Classification Search
CPC ......... G06F 17/30581; G06F 17/30477; G06F 17/30471; G06F 40/186; G06F 16/986; G06F 16/84
USPC ......................................................... 707/626
See application file for complete search history.

(56) References Cited

U.S. PATENT DOCUMENTS

| | | | | |
|---|---|---|---|---|
| 9,785,533 | B2* | 10/2017 | Vazac | G06F 11/3433 |
| 2001/0034771 | A1* | 10/2001 | Hutsch | H04L 29/12047 |
| | | | | 709/217 |
| 2007/0150595 | A1* | 6/2007 | Bhorania | H04L 67/325 |
| | | | | 709/226 |
| 2007/0174420 | A1* | 7/2007 | Khusial | G06F 16/972 |
| | | | | 709/217 |
| 2010/0169311 | A1* | 7/2010 | Tengli | G06F 16/951 |
| | | | | 707/736 |
| 2015/0101057 | A1* | 4/2015 | Fingold | H04L 63/1433 |
| | | | | 726/25 |

* cited by examiner

*Primary Examiner* — Kuen S Lu

(57) ABSTRACT

Disclosed herein is an optimized data interchange system, method and architecture. An original data interchange document, such as a JavaScript™ Object Notation (JSON) document, comprising a number of name/value pairs is separated, or split, into a template document and a data document for separate transmission. The two documents can be recombined at a destination computing device.

9 Claims, 10 Drawing Sheets

```
{ "current_temperature": 55,
  "current_conditions": "sunny",
  "high_temperature": 76,
  "low_temperature": 50,
  "scale": "fahrenheit",
  "sunrise": "05:12 am",
  "sunset": "7:34 pm",
  "humidity": "16%",
  "wind": "7.0 mph",
  "wind_direction": "NNW",
  "hourly_forecast": [
    { "time_of_day": "08", "am_pm": "am", "temperature": 55, "conditions": "sunny", "chance_of_rain": 0 },
    { "time_of_day": "09", "am_pm": "am", "temperature": 58, "conditions": "sunny", "chance_of_rain": 0 },
    { "time_of_day": "10", "am_pm": "am", "temperature": 61, "conditions": "sunny", "chance_of_rain": 0 },
    { "time_of_day": "11", "am_pm": "am", "temperature": 66, "conditions": "sunny and cloudy", "chance_of_rain": 10 },
    { "time_of_day": "12", "am_pm": "pm", "temperature": 72, "conditions": "cloudy with drizzle", "chance_of_rain": 34 },
    { "time_of_day": "01", "am_pm": "pm", "temperature": 73, "conditions": "cloudy with drizzle", "chance_of_rain": 40 },
    { "time_of_day": "02", "am_pm": "pm", "temperature": 76, "conditions": "cloudy with drizzle", "chance_of_rain": 60 },
    { "time_of_day": "03", "am_pm": "pm", "temperature": 76, "conditions": "cloudy with drizzle", "chance_of_rain": 60 },
    { "time_of_day": "04", "am_pm": "pm", "temperature": 75, "conditions": "cloudy with drizzle", "chance_of_rain": 60 },
    { "time_of_day": "05", "am_pm": "pm", "temperature": 74, "conditions": "cloudy with drizzle", "chance_of_rain": 60 },
    { "time_of_day": "06", "am_pm": "pm", "temperature": 70, "conditions": "cloudy with drizzle", "chance_of_rain": 40 },
    { "time_of_day": "07", "am_pm": "pm", "temperature": 66, "conditions": "cloudy with drizzle", "chance_of_rain": 20 }
  ],
  "alert": "Flash flood warning",
  "details": "Today - Sunny with a high of 76F. Winds from NNW to NW at 7 to 11 mph."
}
```

Fig. 2

302 — d64d2ad5c54c8e38a597b064b4c060ceb7dfc8b
304 — (\{55\,sunny\,76\,50\,fahrenheit\,06\12 am\, 7:34 pm\, 16%\} 7.0 mph\,NNW\{(08\,am\,56\,sunny\,0\,03\,am\,58\,sunny\,0\,10\,am\,61\,sunny\,0\,11\,am\,66\,sunny and cloudy\,10\,12\,pm\,72\,cloudy with drizzle\,34\,01\,pm\,73\,cloudy with drizzle\,40\,02\,pm\,76\,cloudy with drizzle\,60\,03\,pm\,76\,cloudy with drizzle\,60\,04\,pm\,75\,cloudy with drizzle\,60\,05\,pm\,74\,cloudy with drizzle\,60\,06\,pm\,70\,cloudy with drizzle\,40\,07\,pm\,66\,cloudy with drizzle\,20\})\0Today - Sunny with a high of 76F. Winds from NNW to NW at 7 to 11 mph.\}

Fig. 3A

306 — d64d2ad5c54c8e38a597b064b4c060ceb7dfc8b
310 — {
308 — "current_temperature": $,
"current_conditions": $,
"high_temperature": $,
"low_temperature": $,
"scale": $,
"sunrise": $,
"sunset": $,
"humidity": $,
"wind": $,
"wind_direction": $,
"hourly_forecast": [
  {"time_of_day": $, "am_pm": $, "temperature": $, "conditions": $, "chance_of_rain": $}
],
"alert": $,
"details": $
}

Fig. 3B

- $ - the placeholder. This symbol will be replaced by the next value retrieved from the data value string.
- [ - increase the nesting level. Expects that the next token in the data stream will be either a \( or a \0.
- ] - decrease the nesting level. Expects that the next token in the data stream will be either a \) or a \0. A \0 would reset the template to the start of the nearest object or array.
- < - start of optional field. If the next token in the data stream is a \0, the text between this < and the corresponding > are removed. Otherwise, this < character and the corresponding > character are not included in the output data.
- > - the closing indicator of a an option field.
- \ - the escape character. This symbol causes the following symbol to be emitted without interpretation. Should be used if any of the above special characters appear in the template that should simply be emitted, rather than be interpreted as a special character.

Fig. 4

- \, - is the separator. It's used to separate different values in the data value string. (binary value 0)
- \( - increase the nesting level by 1. (binary value 1)
- \) - decrease the nesting level by 1. (binary value 2)
- \0 - indicates that the corresponding array or object should be null (binary value 3)
- \\ - is the escape character. The escape causes the following character to be a regular character, even if it's a special character. This is used when a special character is used as a value in an orginal document. (binary value 4)
- \+ - array or ordered list of zero or more values

Fig. 5

| | Template | Data value string | Original |
|---|---|---|---|
| 602 | | | |
| 604 | {"x": "$"} | \(hello\) | {"x": "hello"} |
| 606 | {"x": "$", "y": "$"} | \(hello\,there\) | {"x": "hello", "y": "there"} |
| 608 | {"x": {"y": $}} | \(()\) | {"x": null} |
| 610 | {"x": {"y": $}} | \(+88\) | {"x": 88} |
| 612 | {"x": [$]} | \(()\) | {"x": null} |
| 614 | {"x": [$]} | \(+()\) | {"x": []} |
| 615 | {"x": [$]} | \(+a\,b\,c\) | {"x": ["a", "b", "c"]} |
| 616 | {"x": [{"y": "$"}]} | \(\(a\)\(b\)\(c\)\) | {"x": [{"y": "a"}, {"y": "b"}, {"y": "c"}]} |
| 618 | {"x": "$"} | \(25\\0\) The data values contain \, which is indicated by the \\. | {"x": "25\0"} |
| 620 | {"x[]": "$"} | \(()\) | {"x[]": null} |
| 622 | {"x": {"y": "$"<, "z": "$">}} | \(\(a\)\) | {"x": {"y": "a"}} |
| | {"x": {"y": "$"<, "z": "$">}} | \(\(a\,b\)\) | {"x": {"y": "a", "z": "b"}} |

Fig. 6

- $ - the placeholder. This symbol will be replaced by the next value retrieved from the data value string.
- { - increase the nesting level. Expects that the next token in the data stream will be either a \{ or a \0.
- } - decrease the nesting level. Expects that the next token in the data stream will be either a \} or a \0. A \0 would reset the template to the start of the nearest object or array.
- < - start of optional field. If the next token in the data stream is a \0, the text between this < and the corresponding > are removed. Otherwise, this < character and the corresponding > character are not included in the original document output.
- } - the closing indicator of a an option field.
- \ - the escape character. This symbol causes the following symbol to be emitted without interpretation. Should be used if any of the above special characters appear in the template as literals.

Fig. 8

SIZE-OPTIMIZED DATA INTERCHANGE METHOD AND SYSTEM

CROSS REFERENCE TO RELATED APPLICATIONS

This application is a division of and claims priority from co-pending U.S. patent application Ser. No. 14/978,560, filed Dec. 22, 2015, entitled SIZE-OPTIMIZED DATA INTERCHANGE METHOD AND SYSTEM, the contents of which are hereby incorporated by reference.

FIELD OF THE DISCLOSURE

The present disclosure relates to data interchange, and more specifically to optimizing such data interchange.

BACKGROUND

Data is transmitted from one computing device to another regularly. One data-interchange format that is used in transmitting data is referred to as JavaScript™ Object Notation ("JSON"). JSON uses a name/value pair format to associate a name with a value or an array of values.

SUMMARY

Each time a JSON document is transmitted, both the name and the value(s) used for each name/value, or key/value, pair is transmitted. While the value(s) associated with a name in a name/value pairing can change such that it is beneficial to transmit the value(s), the corresponding name used in the pairing is likely to remain unchanged. It is inefficient to retransmit the name portion of a name/value pair if the name is unchanged from the last transmission. It would be beneficial to improve electronic document transmission and provide efficiencies in connection with such transmission, since making data transmission more efficient improves any computing device's operation and improves each electronic communication medium that transports such data. Embodiments of the present disclosure improve technology via, at least, reducing bandwidth need for transmission, reducing transmission latency and increasing transmission throughput, among other improvements, features, and functions disclosed herein.

Embodiments of the present disclosure separate, or split, an original document containing name/value pairs, such as a JSON document, into a template document and a data document, and allow the two documents to be recombined. In accordance with one or more such embodiments, a template document, or template, includes names from the name/value pairs and a placeholder for the value(s) associated with each name and the data document, or data, includes the values from the name/value pairs. In accordance with one or more embodiments, the template and data documents are generated using a format, which format can be followed to regenerate the original document from the template and data documents. By way of a non-limiting example, a parser can be used to parse an original document, e.g., an original JSON document, to identify each pair and to determine corresponding entries for each of the template and the data documents. The template and data documents can be transmitted separately to a destination, e.g., a user computing device, and used to regenerate the original document. Information included in the template and data documents can be used to determine whether the template document is to be transmitted to, or requested by, the destination computing device.

In accordance with one or more embodiments, a method is provided, the method comprising receiving, by a computing device via an electronic communications network, a web service client application request for web service application data; retrieving, by the computing device, a data document comprising information to determine a value portion of each name-value pair of a plurality of name-value pairs, the data document further comprising a correlation value to be used in identifying a template document to be used with the data document to generate, by a destination computing device, an original document for use by the web service client application, the template document comprising information to determine the name portion of each name-value pair of the plurality; and transmitting, by the computing device via the electronic communications network, the data document in response to the received web service client application data request.

In accordance with one or more embodiments a system is provided, the system comprising a processor and a storage medium for tangibly storing thereon program logic for execution by the processor, the stored program logic comprising: receiving logic executed by e processor for receiving, via an electronic communications network, a web service client application request for web service application data; retrieving logic executed by the processor for retrieving a data document comprising information to determine a value portion of each name-value pair of a plurality of name-value pairs, the data document further comprising a correlation value to be used in identifying a template document to be used with the data document to generate, by a destination computing device, an original document for use by the web service client application, the template document comprising information to determine the name portion of each name-value pair of the plurality; and transmitting logic executed by the processor for transmitting, via the electronic communications network, the data document in response to the received web service client application data request.

In accordance with yet another aspect of the disclosure, a computer readable non-transitory storage medium is provided, the medium for tangibly storing thereon computer readable instructions that when executed cause at least one processor to receive, via an electronic communications network, a web service client application request for web service application data; retrieve a data document comprising information to determine a value portion of each name-value pair of a plurality of name-value pairs, the data document further comprising a correlation value to be used in identifying a template document to be used with the data document to generate, by a destination computing device, an original document for use by the web service client application, the template document comprising information to determine the name portion of each name-value pair of the plurality; and transmit, via the electronic communications network, the data document in response to the received web service client application data request.

A method in accordance with at least one embodiment is provided comprising transmitting, by a computing device via an electronic communications network, a web service application request for web service application data; receiving, by the computing device via the electronic communications network, a data document comprising information to determine the value portion of each name-value pair of a plurality of name-value pairs identifying the web service application data, the data document further comprising a correlation value to be used in identifying a template document to be used with the data document to generate an original document for use by the web service client application, the template document comprising information to determine the name portion of each name-value pair of the plurality; retrieving, by the computing device, the correlation value from the received data document; making a determination, by the computing device, whether the template document containing the correlation value is available in the computing device's local storage; selecting, by the computing device, one of retrieving the template document from the local storage and requesting the template document from a remote storage location based on the determination; and generating, by the computing device, the original document using the data document and the template document.

In a system provided in accordance with one or more embodiments, at least one computing device comprising a processor and a storage medium for tangibly storing thereon program logic for execution by the processor is provided, the stored program logic comprising: transmitting logic executed by the processor for transmitting, via an electronic communications network, a request for a data document comprising information to determine the value portion of each name-value pair of a plurality of name-value pairs included in an original document, the data document further comprising a correlation value to be used in identifying a template document to be used with the data document to regenerate the original document, the template document comprising information to determine the name portion of each name-value pair of the plurality; receiving logic executed by the processor for receiving, via the electronic communications network, the data document; retrieving logic executed by the processor for retrieving the correlation value from the received data document; making logic executed by the processor for making a determination whether the template document containing the correlation value is available in the computing device's local storage; selecting logic executed by the processor for selecting one of retrieving the template document from the local storage and requesting the template document from a remote storage location based on the determination; and generating logic executed by the processor for generating the original document using the data document and the template document.

In another aspect, a computer-readable non-transitory storage medium is provided for tangibly storing thereon computer readable instructions that when executed cause at least one processor to: transmit, via an electronic communications network, a web service application request for web service application data; receive, via the electronic communications network, a data document comprising information to determine the value portion of each name-value pair of a plurality of name-value pairs identifying the web service application data, the data document further comprising a correlation value to be used in identifying a template document to be used with the data document to generate an original document for use by the web service client application, the template document comprising information to determine the name portion of each name-value pair of the plurality; retrieve the correlation value from the received data document; make a determination whether the template document containing the correlation value is available in the computing device's local storage; select one of retrieving the template document from the local storage and requesting the template document from a remote storage location based on the determination; and generate the original document using the data document and the template document.

A method in accordance with yet another aspect, comprises receiving, by a server computing device via an electronic communications network, a web service client application request for web service application data; retrieving, by the server computing device in response to the request, first information to be used to determine the value portion of each name-value pair of a plurality of name-value pairs for use by the web service client application, the first information further comprising a correlation value to be used in identifying second information to be used with the first information to generate, by a destination computing device, the plurality of name-value pairs for use by the web service client application, the second information to be used in determining the name portion of each name-value pair of the plurality; and transmitting, by the server computing device via the electronic communications network, the first information in response to the received web service client application request for web service application data.

A system is provided in accordance with at least one embodiment, the system comprising at least one server computing device, each computing device comprising a processor and a storage medium for tangibly storing thereon program logic for execution by the processor, the stored program logic comprising receiving logic executed by the processor for receiving, via an electronic communications network, a web service client application request for web service application data; retrieving logic executed by the processor for retrieving, in response to the request, first information to be used to determine the value portion of each name-value pair of a plurality of name-value pairs for use by the web service client application, the first information further comprising a correlation value to be used in identifying second information to be used with the first information to generate, by a destination computing device, the plurality of name-value pairs for use by the web service client application, the second information to be used in determining the name portion of each name-value pair of the plurality; and transmitting logic executed by the processor for transmitting, via the electronic communications network, the first information in response to the received web service client application request for web service application data.

In accordance with another aspect, a computer readable non-transitory storage medium is provided for tangibly storing thereon computer readable instructions that when executed cause at least one processor of a server computing device to receive, via an electronic communications network, a web service client application request for web service application data; retrieve, in response to the request, first information to be used to determine the value portion of each name-value pair of a plurality of name-value pairs for use by the web service client application, the first information further comprising a correlation value to be used in identifying second information to be used with the first information to generate, by a destination computing device, the plurality of name-value pairs for use by the web service client application, the second information to be used in determining the name portion of each name-value pair of the plurality; and transmit, via the electronic communications network, the data document in response to the received web service client application request for web service application data.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1, comprising FIGS. 1A and 1B, provides a process flow example for use in accordance with one or more embodiments of the present disclosure.

FIG. 2 provides an example of an original document for use in accordance with one or more embodiments of the present disclosure.

FIG. 3, comprising FIGS. 3A and 3B, provides examples of template and data documents generated using an original document in accordance with one or more embodiments of the present disclosure.

FIG. 4 provides examples of special characters used in a template document in accordance with one or more embodiments of the present disclosure.

FIG. 5 provides examples of special characters used in a data document in accordance with one or more embodiments of the present disclosure.

FIG. 6 provides template, data and original document examples for use in accordance with one or more embodiments of the present disclosure.

FIG. 7 provides an example of pseudocode for use in generating the original document from the template and data documents in accordance with one or more embodiments.

FIG. 8 provides examples of special characters that may be used in a XML template.

DETAILED DESCRIPTION

Figure 1A:
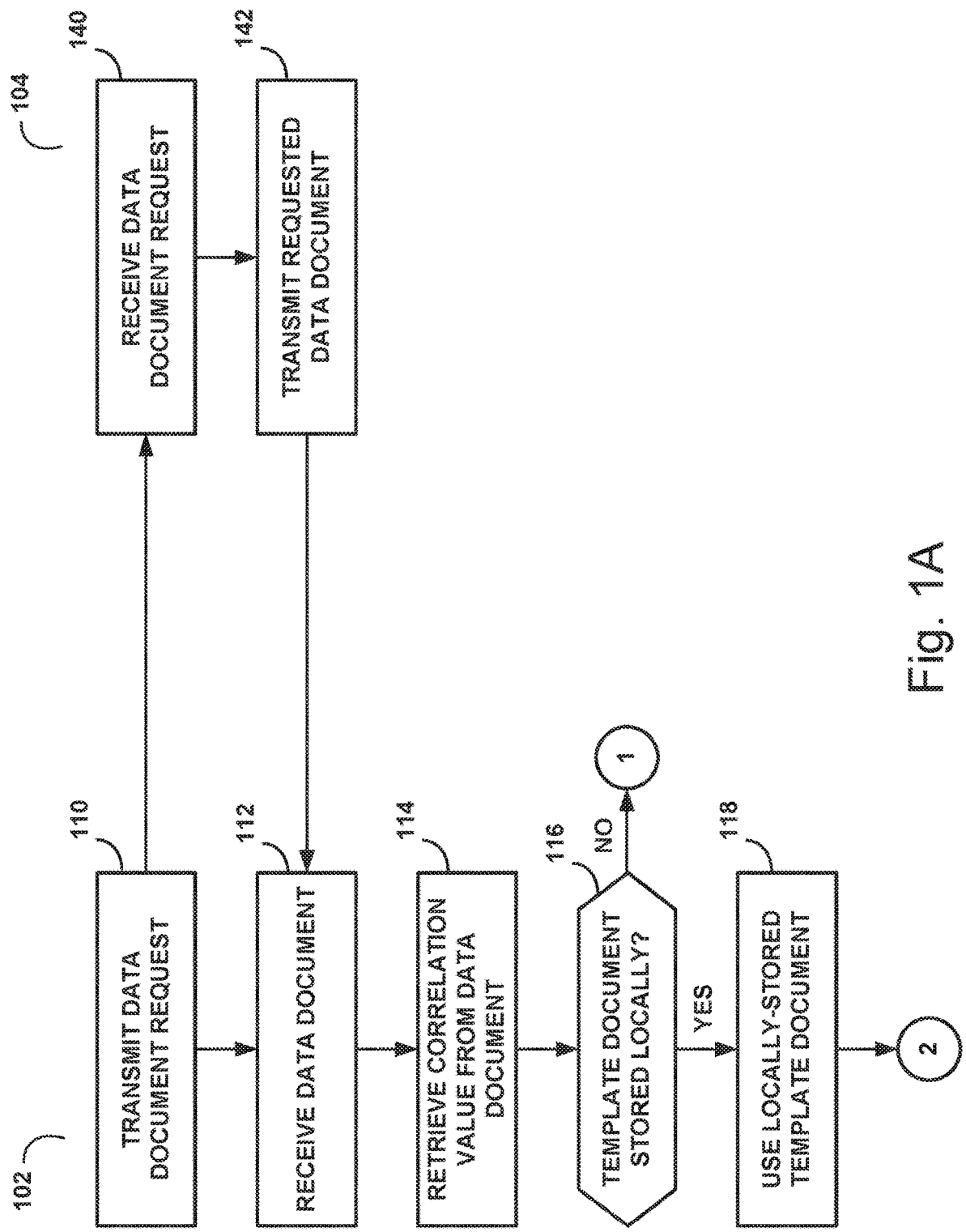

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a size optimized data interchange system, method and architecture. In accordance with one or more embodiments, an original data interchange document, such as a JSON document, comprising a number of name/value pairs is separated, or split, into a template document and a data document for separate transmission. The two documents can be recombined at a destination computing device, which might be a user computing device or other computing device.

In accordance with one or more such embodiments, a template document, or template, includes names from the name/value pairs and a placeholder for the value(s) associated with each name and the data document, or data, includes the values from the name/value pairs. In accordance with one or more embodiments, the template and data documents are generated using a format, which format can be followed to regenerate the original document from the template and data documents. By way of a non-limiting example parser can be used to parse an original document, e.g., an original JSON document, to identify each pair and to determine corresponding entries for each of the template and the data documents. By way of yet another non-limiting example, some or all of each of the template and data documents may be provided by a web service application executed by at least one server computing device that is servicing a web service client application being executed by one or more client computing devices.

Web service application data, which may contained in a data document, may be updated periodically to reflect new data being generated by the web service application. A corresponding template document may not change as frequently as the data. Accordingly, the template and data documents can be transmitted separately to a destination, e.g., a user computing device. Data and template information can be used to regenerate name-value pairs for used by a web service client application. In accordance with one or more embodiments, the name-value pairs can be contained in the original document, which can be used by the web service client application to refresh the application's display at a client computing device. Information included in the template and data documents can be used to determine whether the template document is to be transmitted to, or requested by, the destination computing device. The template and data documents can be used to regenerate the original document, or to regenerate the name-value pairs.

Figure 1B:
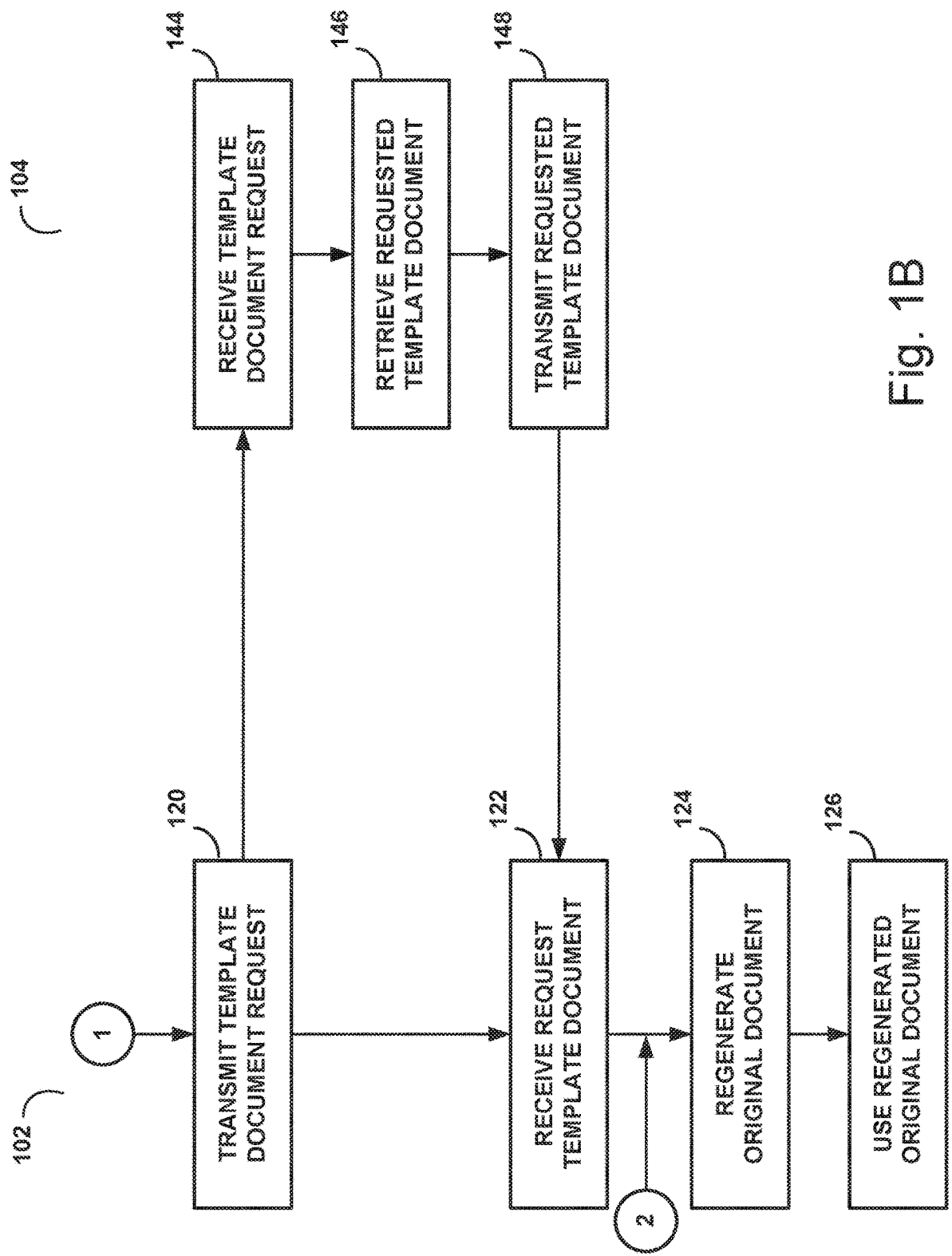

FIG. 1, comprising FIGS. 1A and 1B, provides a process flow example for use in accordance with one or more embodiments of the present disclosure.

In the example shown in FIG. 1, the left side 102 of the flow, or flow 102, can be performed by a destination computing device, such as and without limitation a client, or user, computing device, and the right side 104 of the flow, or flow 104, can be performed by server computing device. In accordance with one or more embodiments, the server computing device is configured to provide an application programming interface (API) for a web service that provides certain capabilities to applications, e.g., providing web service output including providing template and data documents and/or or original document output that can be used to generate template and data documents. By way of some non-limiting examples, an auction web service allows users to create listings and other users to make bids, and a weather web service provides information about the weather forecast for a given location. A web service is typically used by a client application, such as and without limitation, a browser application, weather application, auction application, etc.

A web service API can have a number of endpoints, which may be identified using a pointer that has a format similar to a universal resource locator (URL). By way of a non-limiting example, a request directed to a weather web service endpoint may appear as follows:

http://yahoo.com/api/weather/v1/conditions?city=Taipei

In the above example, the endpoint includes a scheme identifier, e.g., http, a host designation, e.g., yahoo.com, a path, e.g., api/weather/v1/conditions, and a query, e.g., ?city=Taipei.

At step 110, a request, such as and without limitation a web service client application data request generated by a client application executing on a user's computing device, is transmitted to a web service application, or application endpoint, in accordance with one or more embodiments of the present disclosure. The request may be transmitted to the endpoint via an electronic communications network, or networks, which may include the internet, or web, for example.

At step 140, the endpoint identified in the request receives the request, and responds to the request, at step 142, by retrieving and transmitting information, or a data document comprising information, to determine a value portion of each name-value pair of a plurality of name-value pairs, e.g., name-value pairs identifying web service application data. The endpoint transmits the information, or the data document comprising the information, in place of the name-value pairs, or an original document comprising both names and data values, e.g., a number of name/value pairs.

FIG. 2 provides an example of an original document for use in accordance with one or more embodiments of the present disclosure. In the example of FIG. 2, the document comprises a number of name/value pairs, each of which is formatted with the name in quotes, followed by a delimiter, e.g., ":", and a value, which may be, for example a text value in quotes or a numeric value. By way of some of the non-limiting examples of name/value pairs provided in FIG. 2, "current_temperature", "current_conditions", "scale" are examples of names and 56, "sunny" and "Fahrenheit" are the respective corresponding value examples. As yet a further non-limiting example, the value associated with the "hourly_forecast" name comprises an array of name/value pairs.

In accordance with one or more embodiments, the original document shown in FIG. 2 can be used to generate a data document and a template document. FIG. 3, comprising FIGS. 3A and 3B, provides examples of template and data documents, respectively, generated using the original document shown in FIG. 2.

FIG. 3A, which provides an example of a data document in accordance with one or more embodiments, comprises components 302 and 304. Component 302 comprises a correlation value, which is a unique identifier for the data document and can be used to match the data document with a corresponding template document, which has the same or matching correlation value. The data and template documents with a matching correlation value can used to regenerate the original document from which the data and template documents were built. By way of a non-limiting example, when an original document, such as the original document shown in FIG. 2, is used to generate data and template documents, a correlation value is generated to populate components 304 and 306. By way of a further non-limiting example, the correlation value can comprise a secure hash algorithm (SHA) value generated using a secure hash algorithm and the template document. Other suitable techniques can be used with embodiments of the present disclosure to determine a correlation value. A correlation value used with one or more embodiments of the present disclosure can be generated using a MD5, for example.

Component 306 of FIG. 3B comprises a matching correlation value, e.g., the same correlation value as component 302, which indicates that component 308 of the template document shown in FIG. 3B can be used with component 304 of the data document shown in FIG. 3A to regenerate the original document, e.g., the original document shown in FIG. 2. The original document shown in FIG. 2 can be regenerated by re-associating each of the names included in component 308 with its corresponding value, or values in component 304. In the example shown in FIG. 3B, each name has a corresponding placeholder 310, e.g., $, which indicates a location at which a corresponding value component from component 304 of FIG. 3A is to be used in generating the original document. Components 304 and 308 include a number of other special designators, which are used in regenerating the original document and are discussed in more detail below.

In accordance with one or more embodiments, the template document can be devoid of any values, e.g., the values are represented using placeholders for the values in the template document. Alternatively, the template document may contain one or more values, in one or more name-value pairs, as well as placeholders representing one or more other values. In accordance with one or more such embodiments, the template and/or data documents can be generated electronically by a computing device. In some cases, such as in the case of optional fields, different template documents might be electronically generated. An electronically-generated template document, and/or data document, can be edited by a user.

Referring again to FIG. 1A, the data document transmitted by the endpoint, at step 142, is received by requester at step 112. At step 114, the correlation value is retrieved from the received information. In accordance with one or more embodiments, the requester can store a number of template documents in local storage, e.g., persistent storage, cache, etc. At step 116, the requester uses the correlation value retrieved from the data document to determine whether or not a corresponding template document is locally available, e.g., stored in local storage. By way of a non-limiting example, the requester might search local storage to find a template document with a matching correlation value.

If it is determined, at step 116, that the template document with a matching correlation value is available locally, processing continues at step 118 to use the locally-stored document. If, at step 116, it is determined that the template document is not locally available, processing continues at step 120, of FIG. 1B, to transmit another request, e.g., another web service client application request, for the template information, which may be contained in a template document. The other request may be transmitted to the same or a different endpoint than the request transmitted at step 110. The endpoint might include an indicator specifying whether the request is a data request or a template request, e.g., added to the endpoint's path portion.

By way of a non-limiting example, the above path component, e.g., api/weather/v1/conditions, can be modified to include either njson or njsont to indicate a data document request or a template document request, respectively. To illustrate further, a path for used to designate an endpoint used in a data document request might be api/weather/v1/conditions.njson, and a path used to designate an endpoint used in a template document request might be api/weather/v1/conditions.njsont.

By way of another non-limiting example, a query parameter might be used to designate the data document and template document request endpoints. By way of a further non-limiting example, ?njson=true might be used in a data document request and ?njsont=true might be used in a template document request. Other suitable techniques can be used with embodiments of the present disclosure to specify the data document and template document endpoints, such as and without limitation HTTP Accept headers.

The template request is received by an endpoint at step 144. In response, the requested template is retrieved, at step 146, and transmitted to the requester, at step 148. The transmitted template is received by the requester at step 122.

The template, which is either retrieved from local storage or received in response to a template request, is used with the data document to generate a plurality of name-value pairs, e.g., to generate name-value pairs for the original document, to be used by the client application, at step 124. The name-value pairs generated at step 124 can be used by the client application at step 126.

In the example shown in FIG. 1, the client application executing on a client computing device can perform the steps shown in flow 102. However, one or more other computing devices may be used to perform at least some of the steps of flow 102. By way of a non-limiting example, a modem device, proxy server or other computing device may be used to at least some of the steps of flow 102.

As discussed in connection with FIGS. 2 and 3, template and data information may include a number of special characters, or tokens. FIG. 4 provides examples of special characters used in a template document in accordance with one or more embodiments of the present disclosure. In the example shown in FIG. 4, the $ symbol is used as a placeholder in a template document. The placeholder can be replaced with a data value when the template and data documents are used to regenerate the original document. Where nesting is used, the [ and] characters can be used to increase and decrease, respectively, the nesting level.

Embodiments of the present disclosure support optional fields, which may be designated using < and > as the delimiters, such that anything between the two < and > is optional. For example, if the data template includes a \0 token, the portion < and > delimiters and anything between the delimiters is not included in the regenerated original document. Otherwise, the portion of the template document between the < and > delimiters can be used in regenerating the original document.

An escape character, \, can be used in the template document to indicate that the symbol following the escape character is to be included in the regenerated original document without further interpretation. The escape character may be used when a special character is not intended to be interpreted as a special character.

FIG. 5 provides examples of special characters used in a data document in accordance with one or more embodiments of the present disclosure. In the examples provided in FIG. 5, the special characters are represented in the form of a backslash followed by another character, such as \X in general terms. The \X format is used herein for ease of illustration. In accordance with one or more embodiments, each special character may be a binary value, such as 0, 1, 3 and 4 binary values. Preferably, the binary values used would be binary values that do not normally appear in original documents.

In the example shown in FIG. 5, \, is a separator, \(increases nesting, \) decreases nesting, \0 is a null indicator, \\ indicates that a special character is to not intended to be used as a special character, and \+ indicates an array or ordered list of zero or more values.

FIGS. 4 and 5 provide examples of template and data document designations for use in accordance with one or more embodiments of the present disclosure. The characters used as representations of the designations are illustrative. Any suitable representations can be used with embodiments of the present disclosure.

In accordance with one or more embodiments, a template document is matched with a data document and the matching documents are used to generate an original document. FIG. 6 provides some template, data and original document examples. The original document examples may be generated from the template and data document. Furthermore, the examples provided in FIG. 6 illustrate template and data documents that can be generated from the original document examples.

Figure 7:
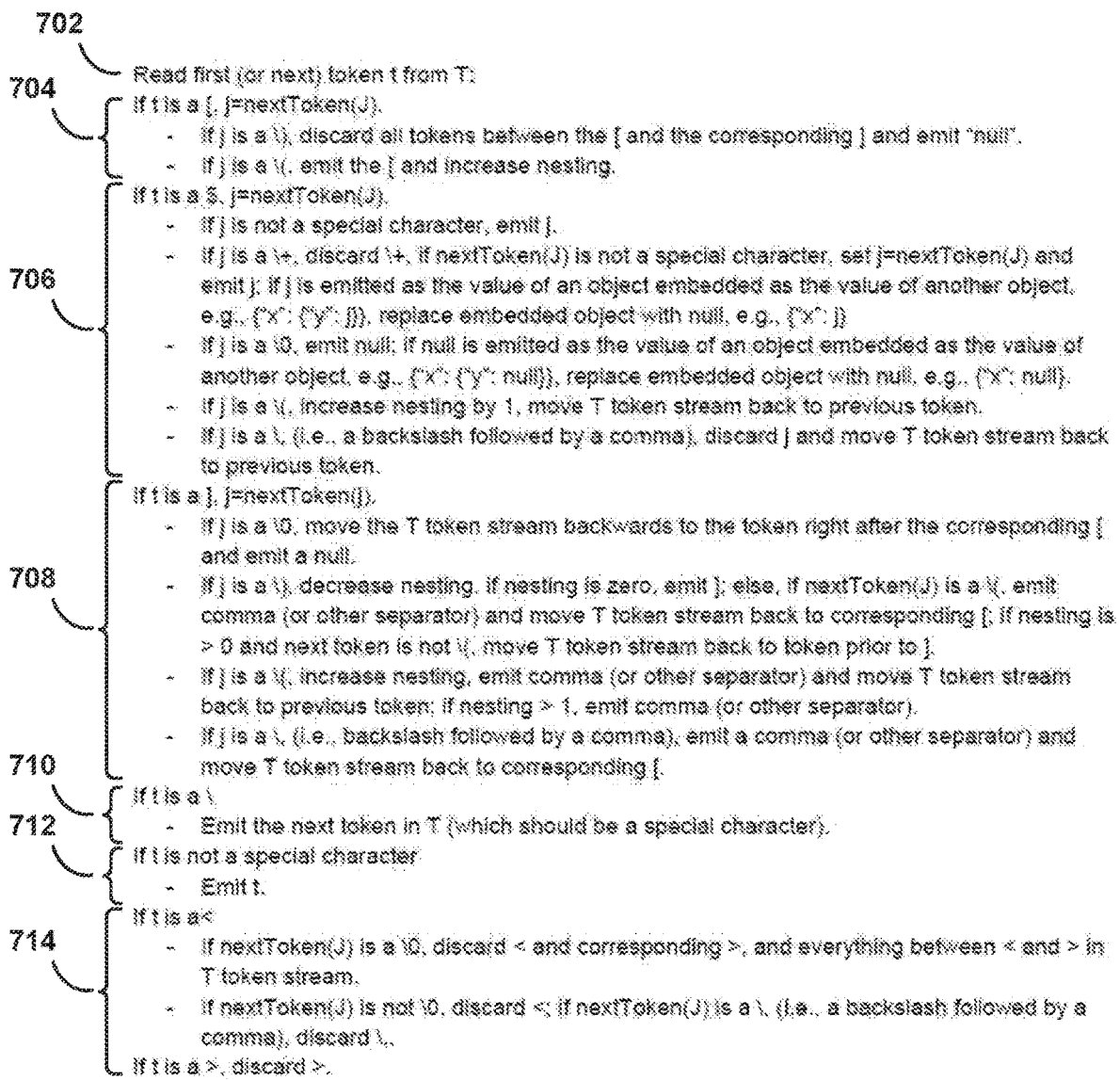

FIG. 7 provides an example of pseudocode for use in generating the original document from the template and data documents in accordance with one or more embodiments. In the pseudocode, T represents a stream of tokens from a template document, e.g., such as from component 308 of FIGS. 3B; and J represents a stream of tokens from a data document, e.g., such as form component 304 of FIG. 3A.

In the example pseudocode, a function nextToken is used to parse the data in the data document to retrieve the nextToken in the data. By way of some non-limiting examples, a token can be a special character or other content, such as a numeric value or character string data. The other content can be content that is located between special characters, for example. The example pseudocode identifies a token t in the template document's token stream T. By way of some non-limiting examples, a token t can be a special character or content other than a special character. By way of a further non-limiting example, the string \(hello\,there\) can be broken into five tokens: \(, hello, \,, there and \) by the nextToken function.

In the template document examples, the curly brackets, { and }, designate an object, which may comprise a number of name/value pairs, and the value portion may be an object. In example 602 of FIG. 6, each character in the template string {"x": "$"} is interpreted as a token, and the corresponding data string has three tokens: \(, hello and \). With reference to the pseudocode of FIG. 7, each token from the template string is emitted, or output, to the original document without alteration up to the $ special character, which is replaced by the hello token from the data string. The result is the original document containing an object: {"x": "hello"}, which includes one name/value pair. In example 604, the template string includes an object with two name/value pairs, each of which includes the $ special token. Each instance of the $ token is replaced by a token that is not a special character.

With reference to FIG. 7, a first, or next, token is read from the template's token stream T at portion 702 of the pseudocode, and one or more portions 704, 706, 708, 710, 712 and 714 of the pseudocode can be used depending on the token that is read from stream T. Portions 704 and 708 can be used when the token involves an array specified in the template's token stream T. Portion 706 can be used to process a placeholder token read from the template's token stream T. A token t that is an escape token read from the token stream T can be handled in accordance with portion 710 of the pseudocode. A token t that is not one of the special tokens can be handled in accordance with portion 712 of the pseudocode. Tokens designating optional fields, e.g., < and >, can be processed using portion 714 of the pseudocode.

Examples 606 and 608 include template strings containing an object with a name/value pair, and the value portion of the pairing is an object. In example 606, the value's object is evaluated using the corresponding data string, which includes the \0 special character indicating that the $ is to be replaced by a null value. Since the value's object, {"y": $}, is evaluated to be a null value, the null value can be output instead of the value's object in the original document. Similarly and in example 608, the value's object can be replaced by the value, e.g., 88, in the single element array. In example 608, the array is designated by the \+ special character.

The template string in example 610 includes the tokens [ and ], which indicate an array; however, the document string uses the null token, \0, which results in the value portion of the name/value pair object in the template string being output as a null value when the original document is generated using the template and data strings in example 610. Example 612 uses the same template string as in example 610; however, the data string uses the array token, \+, without any elements in the array, which results in the brackets being output as the value when the original document is generated using the template and data strings in example 612 and the pseudocode example provided in FIG. 7.

In example 614, the data string includes the array token, \+, together with three tokens, a, b and c, which are interpreted using the pseudocode of FIG. 7 as elements of the array. The resulting original document string includes the array elements inside the square brackets indicating the array. In example 615, the value portion of the name/value pair is enclosed in square brackets, which indicate an array, and the data string includes three tokens, a, b and c. In accordance with the pseudocode shown in FIG. 7, each of the three tokens a, b and c are used to generate an array of values, each of which is an object comprising a name/value pair.

In example 616, the data string includes an escape sequence token, A \\, indicating that the next token in the data string, \, is not a special character. Without the escape token, the pseudocode shown in FIG. 7 interprets the character sequence \0 as a special token indicating that a null is to be emitted as part of the output document. As shown in the example, the output includes the \0 character sequence as part of the value portion of the name/value pair that is output to the output document. Example 618 uses an escape character, \, in the template to indicate that the square brackets are not special characters, which results in the square brackets being output as part of the name portion of the name/value pair that is output using the pseudocode shown in FIG. 7.

Examples 620 and 622 provide examples of template strings that include the optional field special characters, < and >. In example 620, the \0 in the data string is interpreted by the pseudocode example of FIG. 7 to not output the portion between the < and > in the template to the output document. In example 620, the data string includes token b rather than the \0 token, which results in the portion between the < and > being output to the output document, and the $ token being replaced by the value b.

Embodiments of the present disclosure may be used with other types of original documents that include name/value pairs, such as and without limitation a document generated according to a markup language such as and without limitation XML, HTML, etc. FIG. 8 provides examples of special characters that may be used in a XML template. The special characters used in the XML example differ from those used in the JSON example to accommodate the characters used in XML. A similar approach can be used with other languages using name/value pairs.

Figure 9:
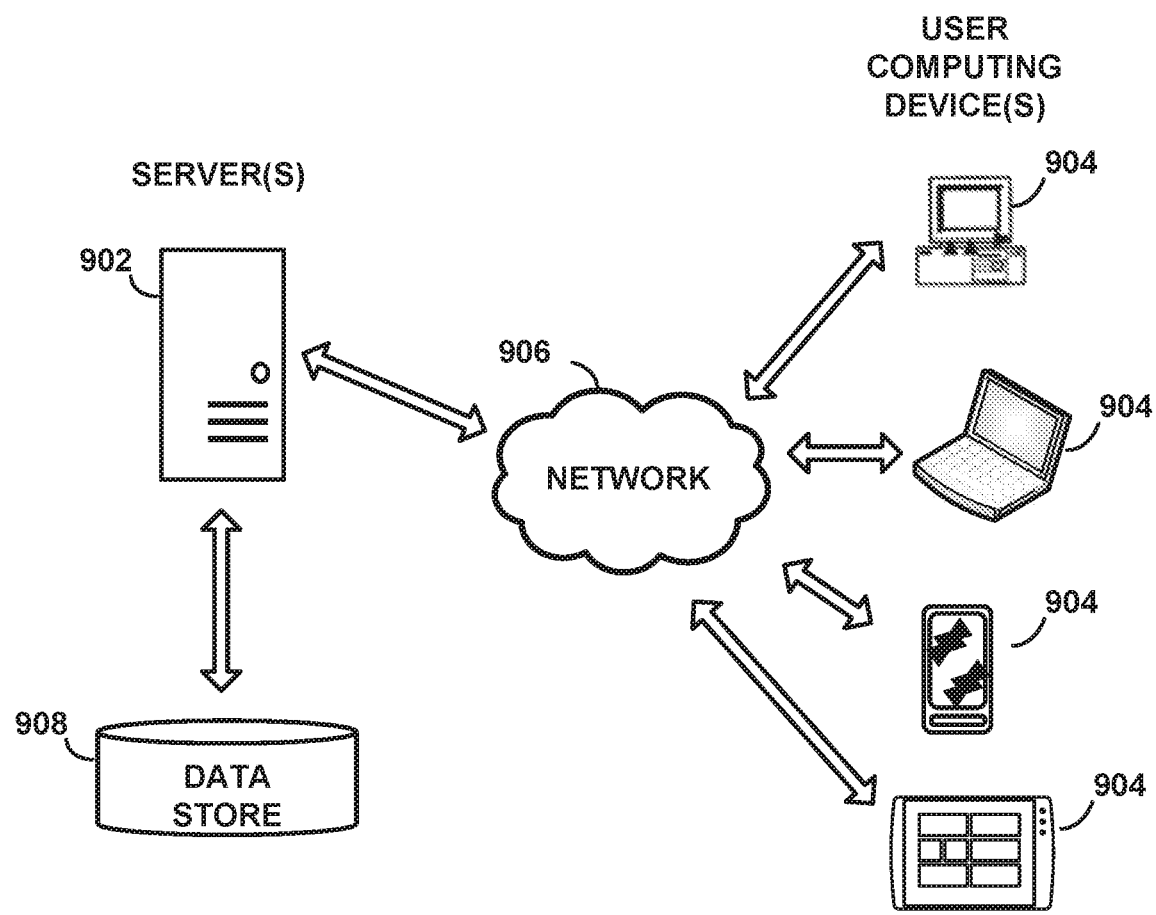
FIG. 9 illustrates some components that can be used in connection with one or more embodiments of the present disclosure.

FIG. 9 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 902 can be configured to execute program code, instructions, etc. to provide functionality in accordance with one or more embodiments of the present disclosure. The same or another computing device 902 may be configured to execute program code to implement functionality in accordance with one or more embodiments of the present disclosure.

Computing device 902 can serve content to user computing devices 904 using a browser application via a network 906. Data store 908 can be used to store program code to configure a server 902 to functionality in accordance with one or more embodiments of the present disclosure.

The user computing device 904 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 902 and the user computing device 904 can include one or more processors, memory, a removable media reader, network interface, display and interface, and one or more input devices, e.g., keyboard, keypad, mouse, etc. and input device interface, for example. One skilled in the art will recognize that server 902 and user computing device 904 may be configured in many different ways and implemented using many different combinations of hardware, software, or firmware.

In accordance with one or more embodiments, a computing device 902 can make a user interface available to a user computing device 904 via the network 906. The user interface made available to the user computing device 904 can include content items, or identifiers (e.g., URLs) selected for the user interface in accordance with one or more embodiments of the present invention. In accordance with one or more embodiments, computing device 902 makes a user interface available to a user computing device 904 by communicating a definition of the user interface to the user computing device 904 via the network 906. The user interface definition can be specified using any of a number of languages, including without limitation a markup language such as Hypertext Markup Language, scripts, applets and the like. The user interface definition can be processed by an application executing on the user computing device 904, such as a browser application, to output the user interface on a display coupled, e.g., a display directly or indirectly connected, to the user computing device 904.

In an embodiment the network 906 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 9. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 10:
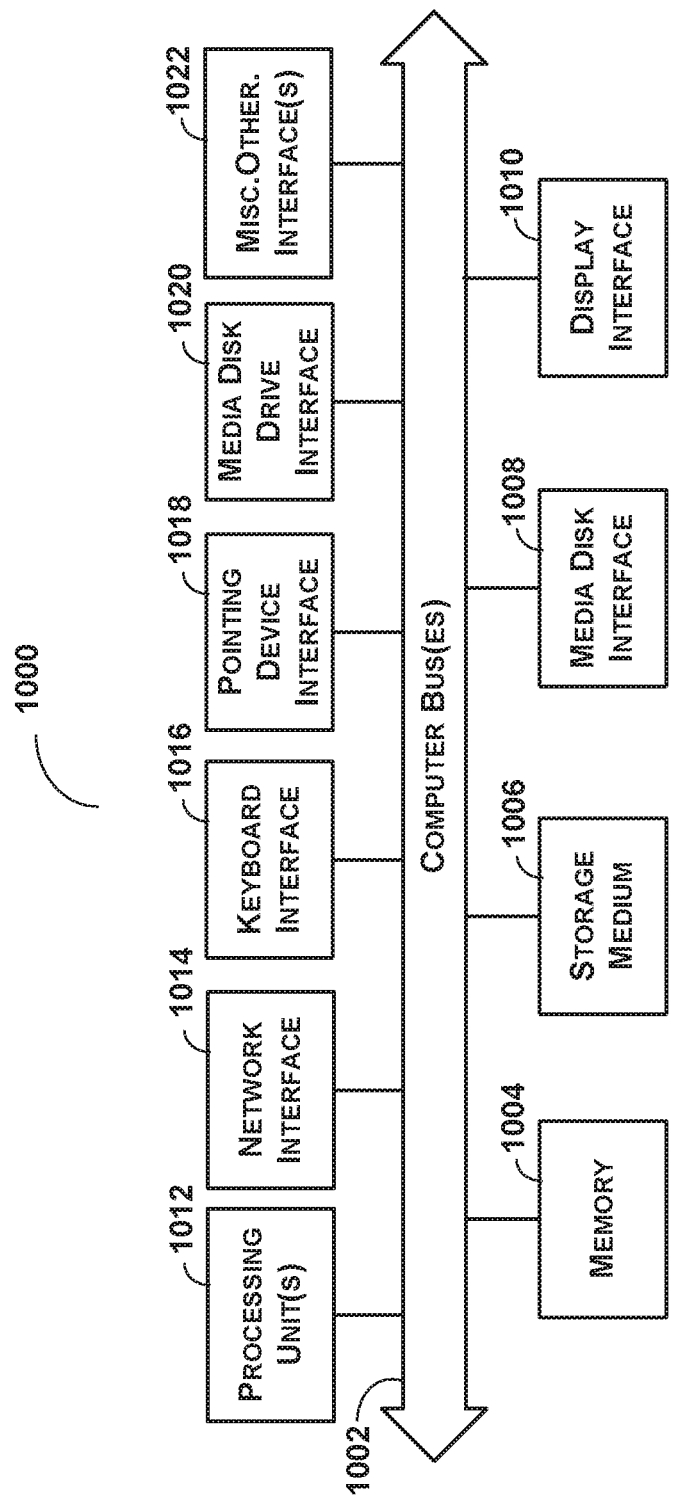
FIG. 10 is a detailed block diagram illustrating an internal architecture of a computing device in accordance with one or more embodiments of the present disclosure.

FIG. 10 is a detailed block diagram illustrating an internal architecture of a computing device, e.g., a computing device such as server 902 or user computing device 904, in accordance with one or more embodiments of the present disclosure. As shown in FIG. 10, internal architecture 1000 includes one or more processing units, processors, or processing cores, (also referred to herein as CPUs) 1012, which interface with at least one computer bus 1002. Also interfacing with computer bus 1002 are computer-readable medium, or media, 1006, network interface 1014, memory 1004, e.g., random access memory (RAM), run-time transient memory, read only memory (ROM), etc., media disk drive interface 1020 as an interface for a drive that can read and/or write to media including removable media such as floppy, CD-ROM, DVD, etc. media, display interface 1010 as interface for a monitor or other display device, keyboard interface 1016 as interface for a keyboard, pointing device interface 1018 as an interface for a mouse or other pointing device, and miscellaneous other interfaces not shown individually, such as parallel and serial port interfaces, a universal serial bus (USB) interface, and the like.

Memory 1004 interfaces with computer bus 1002 so as to provide information stored in memory 1004 to CPU 1012 during execution of software programs such as an operating system, application programs, device drivers, and software modules that comprise program code, and/or computer-executable process steps, incorporating functionality described herein, e.g., one or more of process flows described herein, CPU 1012 first loads computer-executable process steps from storage, e.g., memory 1004, computer-readable storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage, e.g., medium/media 1006, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   transmitting, by a computing device via an electronic communications network, a web service client application request for web service application data;
   receiving, by the computing device via the electronic communications network, a data document comprising information to determine a value portion of each name-value pair of a plurality of name-value pairs identifying the web service application data, the data document further comprising a correlation value to be used in identifying a template document to be used with the data document to generate an original document for use by the web service client application, the template document comprising information to determine the name portion of each name-value pair of the plurality;
   retrieving, by the computing device, the correlation value from the received data document;
   making a determination, by the computing device, whether the template document containing the correlation value is available in the computing device's local storage;
   selectively retrieving, by the computing device, the template document from the local storage or from a remote storage location based on the determination; and
   generating, by the computing device, the original document for use by the web service client application, the original document being generated using the data document and the template document.

2. The method of claim 1, further comprising:
   displaying, on a display of the computing device, at least a portion of a web page using the generated original document.

3. The method of claim 1, the original document generated using the data document and the template document is a regenerated version of an initial document comprising the plurality of name-value pairs.

4. The method of claim 1, making a determination further comprising using, by the computing device, the correlation value retrieved from the data document to determine whether a locally-stored template document contains the correlation value.

5. The method of claim 1, the original document generated using the data document and template document comprises the web service application data for use by the web service client application.

6. A system comprising:
    at least one computing device, each computing device comprising a processor and a storage medium for tangibly storing thereon program logic for execution by the processor, the stored program logic comprising:
        transmitting logic executed by the processor for transmitting, via an electronic communications network, a web service client application request for web service application data;
        receiving logic executed by the processor for receiving, via the electronic communications network, a data document comprising information to determine a value portion of each name-value pair of a plurality of name-value pairs included in an original document, the data document further comprising a correlation value to be used in identifying a template document to be used with the data document to regenerate the original document, the template document comprising information to determine the name portion of each name-value pair of the plurality;
        retrieving logic executed by the processor for retrieving the correlation value from the received data document;
        making logic executed by the processor for making a determination whether the template document containing the correlation value is available in the computing device's local storage;
        retrieving logic executed by the processor for selectively retrieving the template document from the local storage or from a remote storage location based on the determination; and
        generating logic executed by the processor for generating the original document for use by the web service client application, the original document being generated using the data document and the template document.

7. The system of claim 6, the stored program code further comprising:
    displaying logic executed by the processor for displaying, on a display of the computing device, at least a portion of a web page using the generated original document.

8. A computer readable non-transitory storage medium for tangibly storing thereon computer readable instructions that when executed cause at least one processor to:
    transmit, via an electronic communications network, a web service client application request for web service application data;
    receive, via the electronic communications network, a data document comprising information to determine a value portion of each name-value pair of a plurality of name-value pairs identifying the web service application data, the data document further comprising a correlation value to be used in identifying a template document to be used with the data document to generate an original document for use by the web service client application, the template document comprising information to determine the name portion of each name-value pair of the plurality;
    retrieve the correlation value from the received data document;
    make a determination whether the template document containing the correlation value is available in the computing device's local storage;
    selectively retrieve the template document from the local storage or from a remote storage location based on the determination; and
    generate the original document for use by the web service client application, the original document being generated using the data document and the template document.

9. The computer readable non-transitory storage medium of claim 8, the computer readable instructions further comprising instructions that when executed cause the processor to:
    display, on a display of a computing device, at least a portion of a web page using the generated original document.

* * * * *